Dec. 30, 1969     C. F. HEARN     3,486,645
TRANSPORTATION SYSTEM
Filed Nov. 23, 1966     3 Sheets-Sheet 1
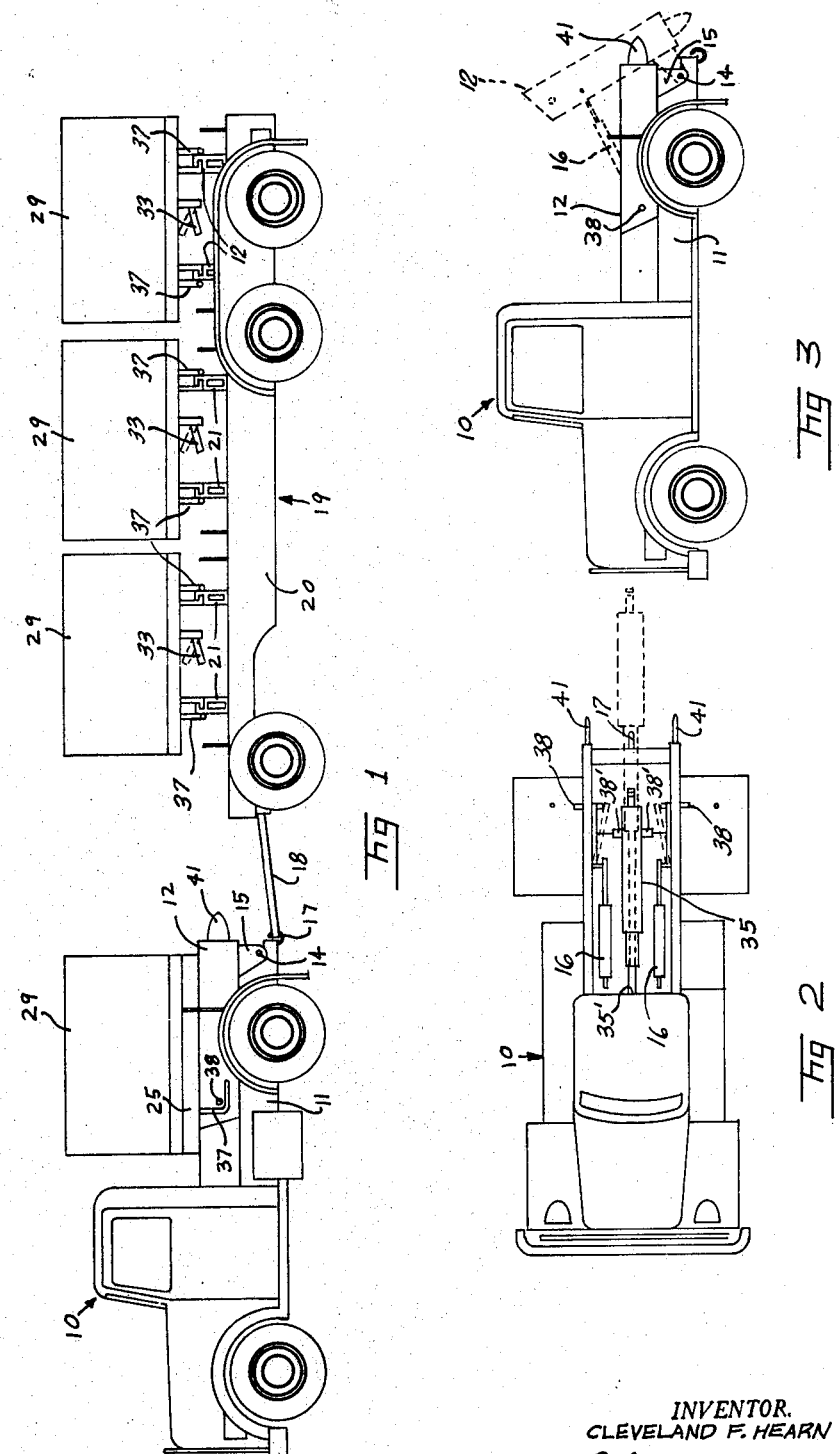
INVENTOR.
CLEVELAND F. HEARN
BY John J. Mills
ATTORNEY Dec. 30, 1969  C. F. HEARN  3,486,645
TRANSPORTATION SYSTEM Filed Nov. 23, 1966  3 Sheets-Sheet 2

INVENTOR.
CLEVELAND F. HEARN
BY

Dec. 30, 1969    C. F. HEARN    3,486,645
TRANSPORTATION SYSTEM

Filed Nov. 23, 1966    3 Sheets-Sheet 3

INVENTOR.
CLEVELAND F. HEARN
BY John J. Mills
ATTORNEY

3,486,645
TRANSPORTATION SYSTEM
Cleveland F. Hearn, Colon, N.C. 27236
Filed Nov. 23, 1966, Ser. No. 596,644
Int. Cl. B60p *1/64, 1/16;* B65j *1/16*
U.S. Cl. 214—38
4 Claims

ABSTRACT OF THE DISCLOSURE

In abstract, a preferred embodiment of this disclosure is a truck-trailer unit in which the truck is used for loading and unloading the trailer, loading and unloading itself, carrying a load and pulling the trailer.

---

This invention relates to transportation systems and more particularly to means for loading, transporting, and unloading palletized cargo from land vehicles.

In the past, various means have been used for loading and unloading cargoes from land vehicles. Likewise, various means and systems have been used in transporting cargo. These various systems, however, have involved the use of auxiliary equipment to accomplish the desired end result. This has included the use of fork-lifts and other devices for loading trucks and trailers as well as various hand-manipulated devices.

Applicant on the other hand, after much research and study into the problems involved and possible solutions thereto, has developed an improved system which incorporates the use of a self-loading tractor vehicle having load carrying capability in conjunction with an improved trailer novelty designed and adapted to allow loading and unloading to be accomplished through use of the self-loading tractor unit. The tractor unit is also adapted to pull the trailer unit to transport goods and to unload the same at the destination.

It is, therefore, an object of the present invention to provide an improved transportation system incorporating a tractor means adapted to load and unload a trailer means and to move said trailer means from one location to another.

Another object of the present invention is to provide a self-loading tractor adapted to load a trailer with cargo, load itself with cargo, transport all of said cargo from one location to another, to unload itself, and to unload said cargo all without the use of auxiliary equipment.

A further object of the present invention is to provide a quick reference aligning means for accurately aligning a self-loading tractor with a trailer to be loaded or unloaded.

Another object of the present invention is to provide an improved means for releasably retaining a palletized load on a trailer during the transport thereof.

Another object of the present invention is to provide a detachable pallet means used in conjunction with a transportation system in which a tractor unit acts as a self-loading device for the trailer which it is adapted to tow.

A further object of the present invention is to provide a releasable pin means used in connection with a detachable pallet in a transportation system wherein the tractor unit acts as a loading and unloading means for the trailer which it is adapted to pull.

Another object of the present invention is to provide a detachable pallet means adapted to retainably engage a cargo, said pallet means being adapted to operately engage a tractor-type truck vehicle for loading and unloading said cargo on said truck in combination with means for off loading said cargo onto a trailer means, said off loading means being adapted to reload said cargo onto said tractor for final off loading at a desired destination.

Other objects and advantages of the present invention will come apparent and obvious from a study of the following description and the accompanying drawings which are merely illustrative of the present invention.

In the drawings:

FIG. 1 is a side elevational view of the various units of the present invention in highway transport relationship to each other;

FIG. 2 is a top plan view of the tractor unit of the present invention showing the various means for loading and moving the cargo units;

FIG. 3 is a side elevation of the tractor unit showing the manner of operation of its cargo bed;

Figures 9, 10, 11:
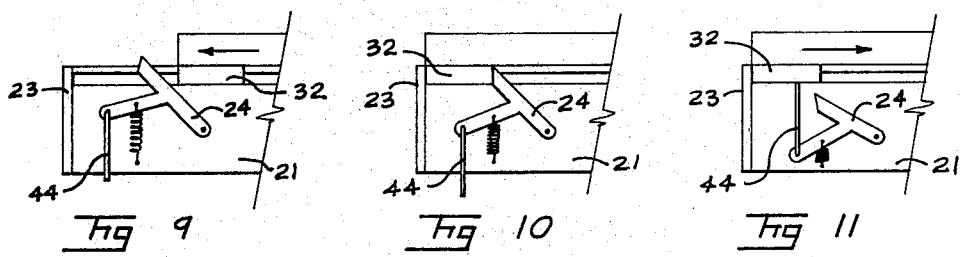

FIG. 9 discloses the cargo latch mechanism in rest position;

FIG. 10 is the same latch mechanism in engaged position; and

FIG. 11 shows such latch mechanism in released position.

With further reference to the drawings, a tractor unit 10 is provided having a sub-frame 11 on the rear portion thereof. A cargo support bed 12 is adapted to lie above and juxtaposed to the sub-frame 11 in rest position while being capable of pivoting about point 14 of pivot arm 15, particularly as disclosed in FIG. 3.

A pair of hydraulic cylinders 16 are provided which are attached to the sub-frame 11 at one end and the cargo support bed at the other end and adapted to be activated by conventional means (not shown) to pivot the bed relative to the frame.

A pintle assembly 17 is provided at the rear of the tractor 10 adjacent the sub-frame assembly and adapted to operately engage the lunette 18 of trailer 19. Even though the pintle assembly has been found very satisfactory, other coupling assemblies can obviously be used with adequate results.

The trailer 19 is composed of two parallelly disposed frame side members 20 having a series of paired pallet engaging members 21 transversely mounted thereon. Each of these paired engaging members has a lip 22 extending outwardly toward the other member of the pair. At one end of the groove or slot thus formed is a stop 23. A latch mechanism 24, the operation of which will be described in more detail hereinafter, is pivotably mounted on the inside of each of the pallet engaging members 21 adjacent stop 23.

Figure 4:
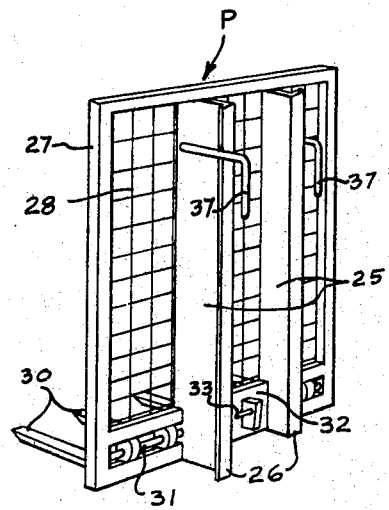
FIG. 4 is a perspective of one form of detachable pallet means.

A preferred embodiment of a load engaging pallet to be used in conjunction with the present invention is disclosed in FIG. 4 wherein support frames 25 are disposed parallel to the longitudinal axes of the pallet. At one edge of the support frames is a lip 26 for engaging the support members 21 of trailer 19. These lips, which are inwardly projecting from each of the support frames, gives such frames an L-shaped cross section.

A pallet frame 27, along with grid 28, are adapted to supportably engage a unit type cargo 29.

To assist in holding the cargo in proper relation to the pallet frame, there are provided a series of tines or forks 30. These are pivotably mounted on rod 31 to allow them to be self-adjusting relative to pre-existing openings in the unit cargo to be transported.

Figure 8:
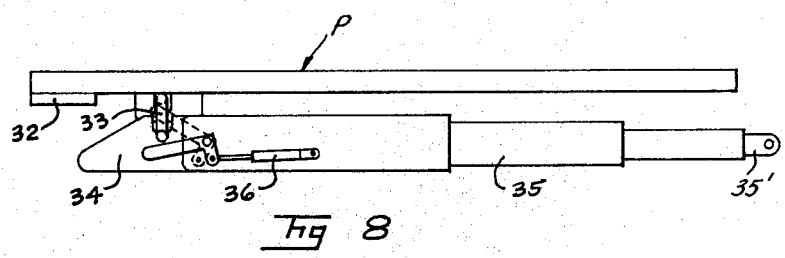
FIG. 8 is a schematic of the loading and unloading means in FIG. 2 in operately relation with a pallet.

A latching mechanism engaging block 32 is provided between support frames 25 of the pallet. A pin 33 is loosely mounted on the underside of block 32 and is adapted to releasably engage hook means 34 of extension and retraction cylinder 35, particularly as disclosed in FIGS. 2 and 8. The end 35' of cylinder 35 is fixedly secured to the truck. A pin release means 36 is provided which may be either a conventional air cylinder as shown or mechanical device and activated by a means not shown.

In actual operation of the present invention, a pallet, indicated generally at P, is placed in an upright position with arms 37 extending outwardly and downwardly. The cargo support bed 12 of the truck tractor 10 is raised from a horizontal to a near vertical position by hydraulic cylinders 16. The truck is then backed until the cargo support bed 12 is juxtaposed to the support frames 25 of the pallet P. A pair of laterally disposed holding pins 38 are provided in such a position on cargo support bed 12 that when they are activated to move outwardly they will engage the pallet arms 37. The activation of the holding pins may be achieved by use of an air cylinder such as that shown at 38', mechanical means, or similar well-known devices.

Figure 5:
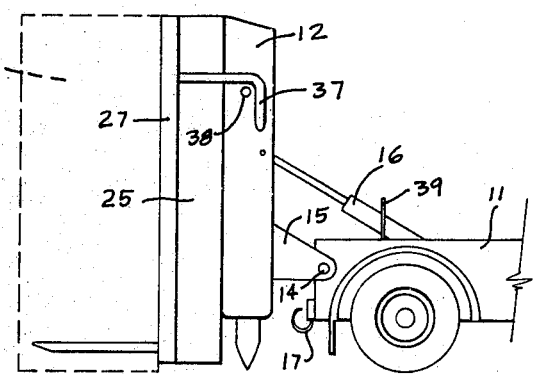
FIG. 5 is a side elevation showing a palletized cargo in pick-up relationship to the tractor units.
Figure 6:
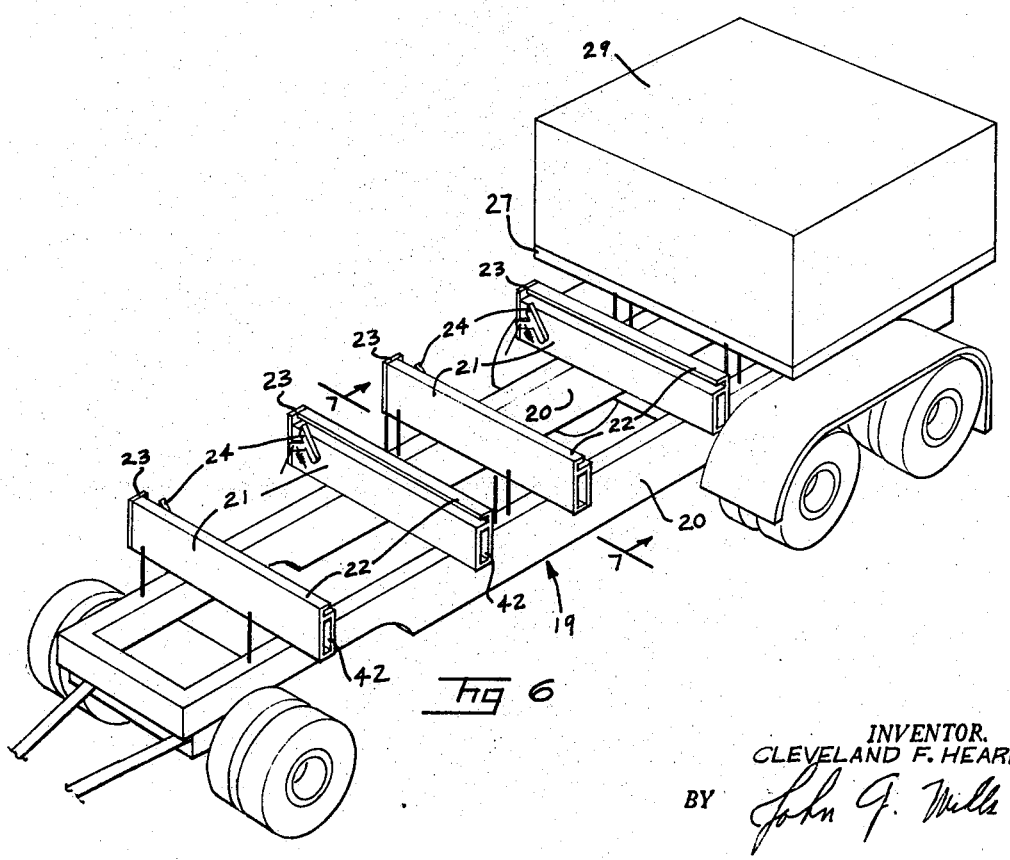
FIG. 6 is a perspective of the trailer unit showing one palletized cargo in transport position.

To prevent the pallet P from dragging the ground when it is moved after engagement between arms 37 and pins 38, the location of the pins from the ground when bed 12 is in vertical position is slightly greater than the distance from the ground to arms 37 when pallet P is resting on the ground in a vertical position. This may be particularly noted in FIG. 5.

To place the pins 38 under the arms 37 without the use of auxiliary lifting equipment for the pallet P, the hydraulic cylinder 16 is activated to move the bed 12 beyond a vertically disposed position so that the angle between sub-frame 11 and cargo support bed 12 is greater than 90 degrees thereby moving holding pins 38 to a point closer to the ground than the distance between the ground and arms 37 thus allowing the pins to be moved outwardly and under said arms.

Once the pins 38 are in engaged position with arms 37, the bed 12 is returned to vertical position by use of cylinders 16. Since the pallet P is raised off the ground, the truck may now move into loading position with a cargo 29. If the cargo is composed of such a configuration that openings are provided to accept forks 30, such as a bailed pile of bricks stacked in such a manner that openings in the lower portion thereof are provided, then the forks of pallet P may move into engaged position with such cargo. The activation of cylinders 16 will cause bed 12 with pallet P and load 29 to move from a vertical position to a horizontal position on sub-frame 11, particularly as disclosed in FIG. 1. The truck tractor 10 may now be maneuvered into loading relationship with the trailer 19. This is assisted by the use of pin markers 39 which are vertically disposed on top of frame side members 20 and on the rear fenders 40 of truck 10. The driver of the truck may align, by use of a mirror or by direct visual reference, the three pins which, when the truck 10 is backed, will align the centering pins 41 with the openings 42 in the ends of pallet support members 21 to allow exact engaged alignment between said pallet support members 21 and the cargo support bed 12.

Figure 7:
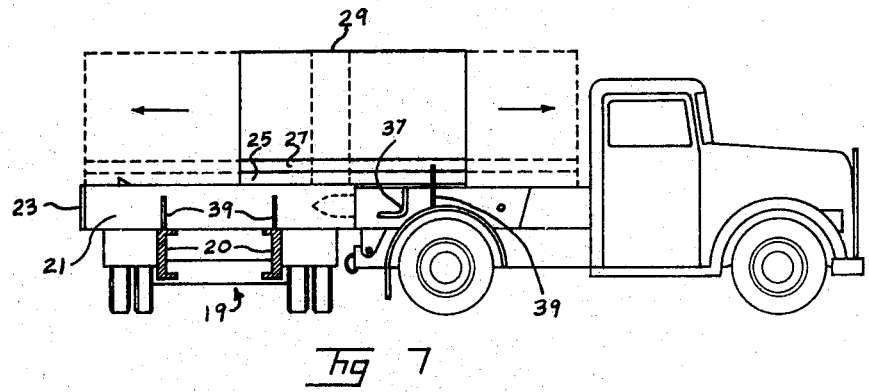
FIG. 7 is a cross section taken through lines 7—7 of FIG. 6 showing, in addition, the relationship of tractor and trailer units during loading and unloading of a cargo.

The extension and retraction cylinder 35 is then activated (by means not shown) to move rearwardly until the beveled portion 43 of hook means 34 raises and then engages pin 33 of pallet P. Once the truck tractor 10 and trailer 19 are in aligned operative relationship, cylinder 35 may be again activated to move rearwardly thereby moving cargo 29 from cargo support bed 12 of truck 10 to pallet support members 21 of trailer 19, particularly as disclosed in FIG. 7.

As cargo 29 moves onto trailer 19, its maximum movement is limited by stop 23. Once the stop has been engaged by the cargo, pin release means 36 is activated to raise pin 33 thereby disengaging it from hook 34. The cylinder 35 then may be retracted to truck tractor 10. The truck tractor now may move away from trailer 19 and is ready to load another cargo onto the trailer as herein above described.

To retain the cargo 29 on trailer 19, a latching mechanism 24 is provided which is pivoted at one end and spring biased in an upward direction. As cargo 29 moves toward stop 23, latch mechanism 24 is depressed by block 32 until the block has passed such mechanism whereupon the spring forces the latch up behind said block. When it is desired to release the cargo 29 from the latched position, particularly as disclosed in FIG. 10, pivotable release rod 44 is moved to engaged position with block 32 thereby holding release mechanism 24 in disengaged position with such block, particularly as disclosed in FIG. 11. Cargo 29, mounted on pallet P, is now free to move in a direction toward the end of the pallet support members 21 opposite stop 23.

In ordinary operation of the transport system of the present invention, the loading of the trailer as described in detail above will be repeated until three palletized cargo units are latchedly mounted on trailer 19. A fourth palletized cargo is then loaded on tractor truck 10, engaged with hook 34 of cylinder 35 to move said cargo toward the front of the truck which makes the cargo more roadable. Next the truck is backed into position so that lunette 18 of trailer 19 may be coupled to the pintle assembly 17. Once this connection is been made, the cargo is ready to be moved on the highway or wherever the driver may be instructed to go.

Once the destination of the truck and trailer has been reached, the pintle assembly 17 is disconnected from lunette 18 and the truck tractor moves into unloading position. To off load the cargo on the tractor 10, cylinder 35 is activated which moves cargo 29 rearwardly until arms 37 engage pins 38. Release mechanism 36 of cylinder 35 is then activated to release pin 33 from hook 34. The cargo support bed 12 may now be pivoted about pivot point 14 from a horizontal to a vertical position by the activation of cylinders 16. By moving the support bed slightly beyond vertical, the pressure exerted on pins 38 by arms 37 may be relieved thereby allowing pins 38 to be laterally retracted. Once this is accomplished truck 10 may move away from the palletized cargo and is ready to off load the cargo units on trailer 19. To off load such, the loading procedure is reversed. The truck 10 is aligned and backed into operative relation with the trailer 19 as when such trailer was loaded. Tri-sectioned cylinder 35 is then extended until hook 34 engages pin 33 of pallet P on which cargo 29 is resting. Release rod 44 is then placed in cooperative relation with block 32 to release latch mechanism 24. Cylinder 35 is then activated to move cargo 29 from the pallet support members 21 of trailer 19 to the cargo support bed 12 of truck tractor 10.

The truck is now ready to be moved away from trailer 19 and to off load cargo 29 as hereinbefore described relative to the cargo transported on said truck. The trailer unloading cycle will be repeated until all cargo units mounted thereon have been off loaded.

Upon the off loading of the last cargo unit, the pallet used in conjunction therewith may be removed therefrom and replaced on the pallet support members 21 of trailer 19 as described in the original loading procedure for such trailer. If it is desired, all the pallets may be replaced on the now empty trailer and tractor units for return to the original loading sight or of course they may be left in engaged position with said cargo.

It is obvious that the present invention has the advantage of allowing more cargo to be loaded on a combination truck-trailer in much less time than has heretofore been required and has the further advantage of allowing the elimination of all auxiliary loading equipment. Further, many of the various features of the present invention are adapted to duel purposes of assisting in loading and unloading as well as retaining the cargo during actual transport.

The terms "upper," "lower," "top," "bottom" and so forth have been used herein merely for convenience in the foregoing specification and in the appended claims to describe the transportation system and its parts as oriented in the drawings. It is to be understood, however, that these terms are in no way limiting to the invention since the parts may obviously be disposed in many different positions when in use.

The present invention may, of course, be carried out in other specific ways than those herein set forth with out departing from the spirit and the essential characteristics of the invention. The present embodiments are therefore to be considered in all respects as illustrative in all changes within the meaning and equivalency range are intended to be embraced herein.

What is claimed is:

1. An improved transportation system comprising a truck-trailer unit; a cargo; pallet means adapted to engagingly support said cargo; at least two horizonatlly disposed, pallet engaging members fixedly secured to said trailer laterally of its longitudinal axis; a longitudinal groove on the facing portions of each of said engaging members; latch means operatively mounted at one end of said engaging members whereby said groove and said mechanism cooperate to releasably retain said pallet means on said trailer; means for releasably attaching said trailer to said truck; a cargo support bed pivotably mounted on said truck; means attached to said bed for releasably engaging said pallet means; means for selectively pivoting said bed from horizontally disposed to vertically disposed positions; and means for moving said pallet onto and from the trailer pallet retaining means whereby said truck may load a plurality of pallets in retained position on said trailer transport the pallets to a desired destination and unload all of said pallets without the use of auxiliary loading and unloading means.

2. The system of claim 1 wherein the pallet means comprising a rectangular pallet frame; a grid fixedly secured to and covering the interior portion formed by said frame; at least two support frames parallelly disposed to the longitudinal axes of said pallet frame and fixedly secured thereto; a rod laterally disposed to the longitudinal axes of said pallet frame and adapted to adjustably retain a series of fork means; and means for attaching said pallet to said tractor loading and unloading means whereby said pallet may engagedly support a cargo being loaded, transported and unloaded by said tractor.

3. The transportation system of claim 1 wherein an aligning means is provided for accurately aligning said tractor with said trailer during the loading and unloading thereof.

4. The system of claim 3 wherein the aligning means comprises at least three rods fixedly secured to said tractor and trailer in aligned relationship when said tractor and trailer are in loading and unloading relation to each other.

References Cited

UNITED STATES PATENTS

| 1,426,408 | 8/1922 | Pezzetti. |
| 2,843,276 | 7/1958 | Copeland. |
| 3,054,522 | 9/1962 | Peck. |

HUGO O. SCHULZ, Primary Examiner

U.S. Cl. X.R.

214—674